INVENTOR.
ROY WITTE
BY
D. C. Staley
HIS ATTORNEY

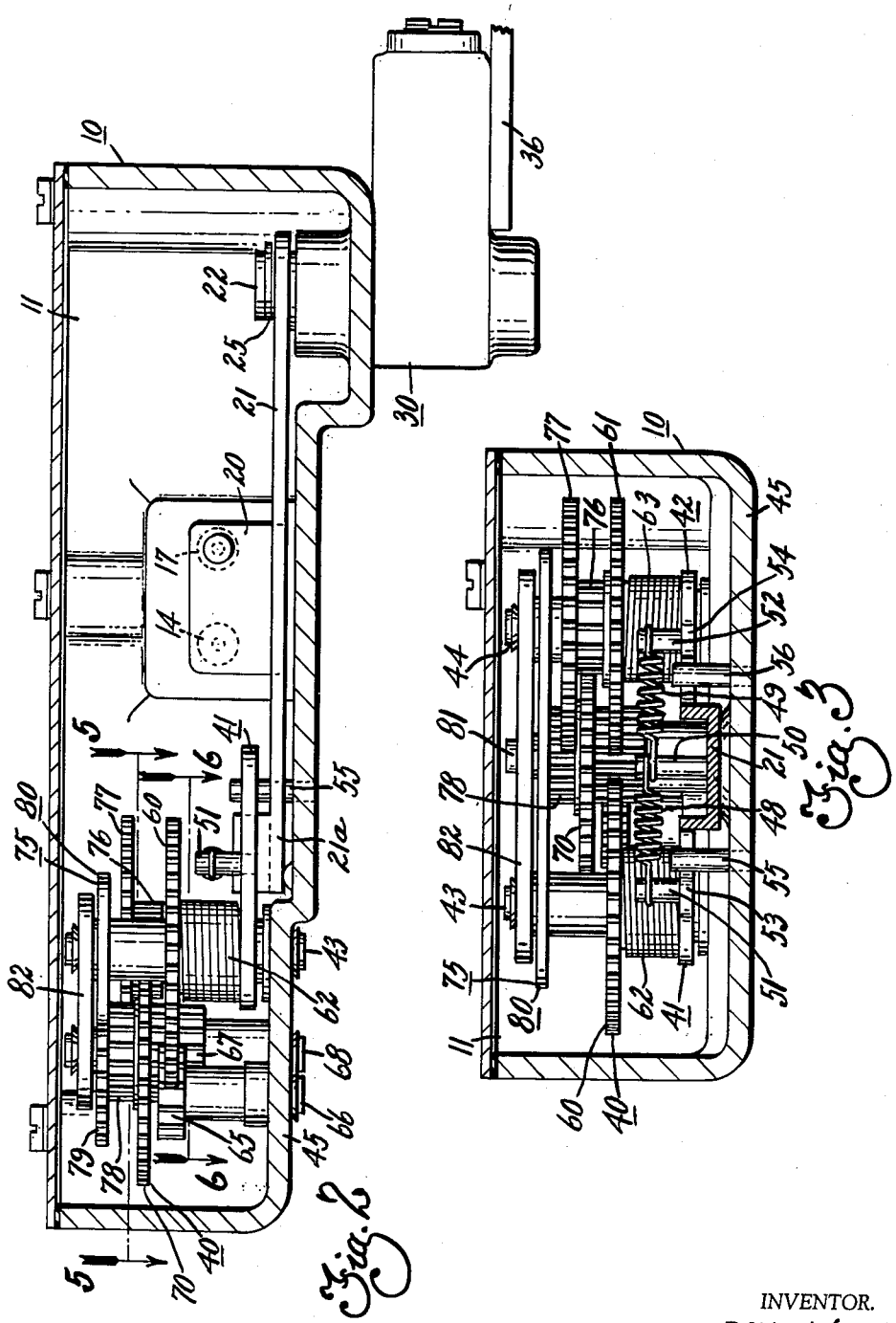

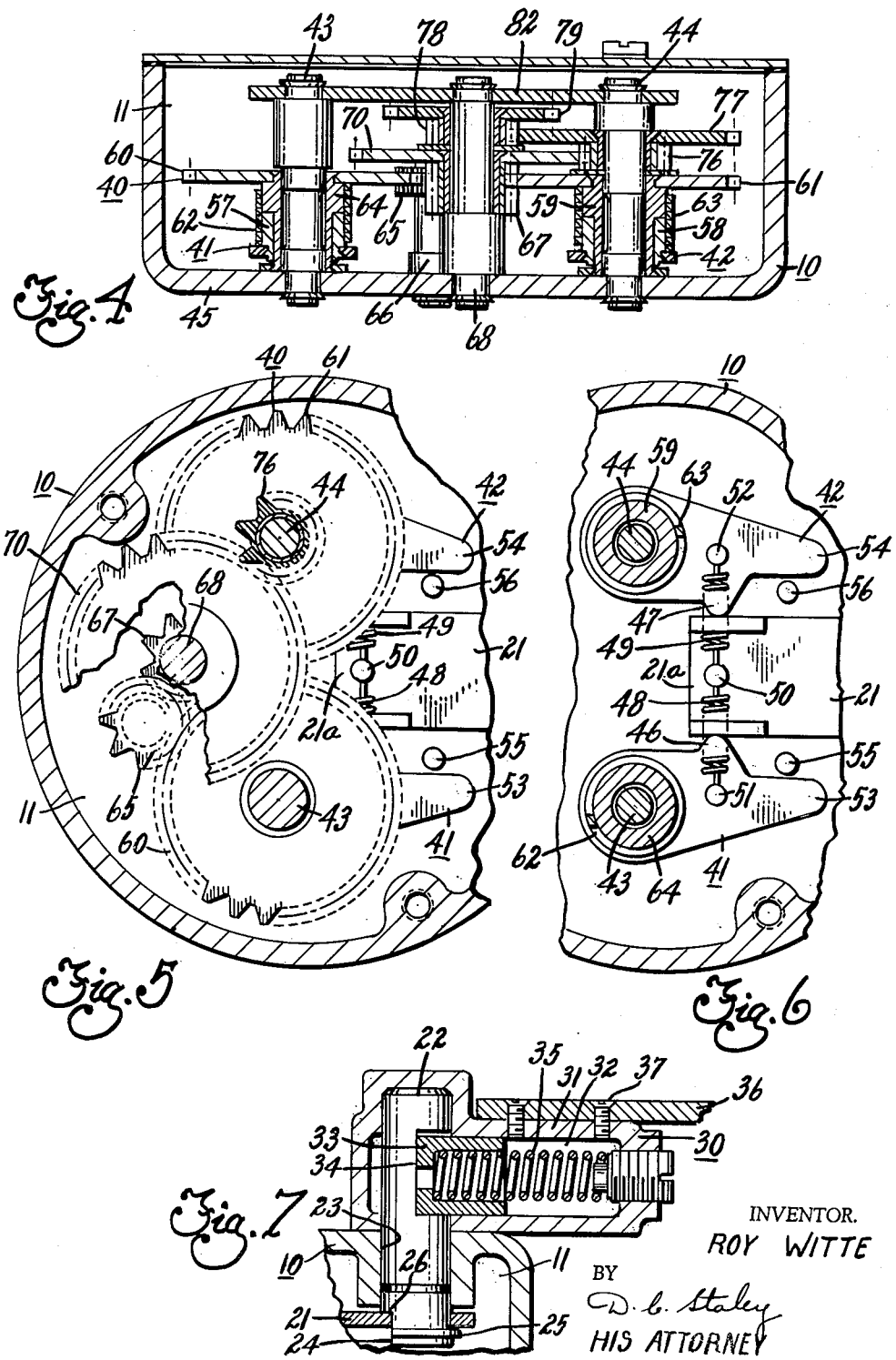

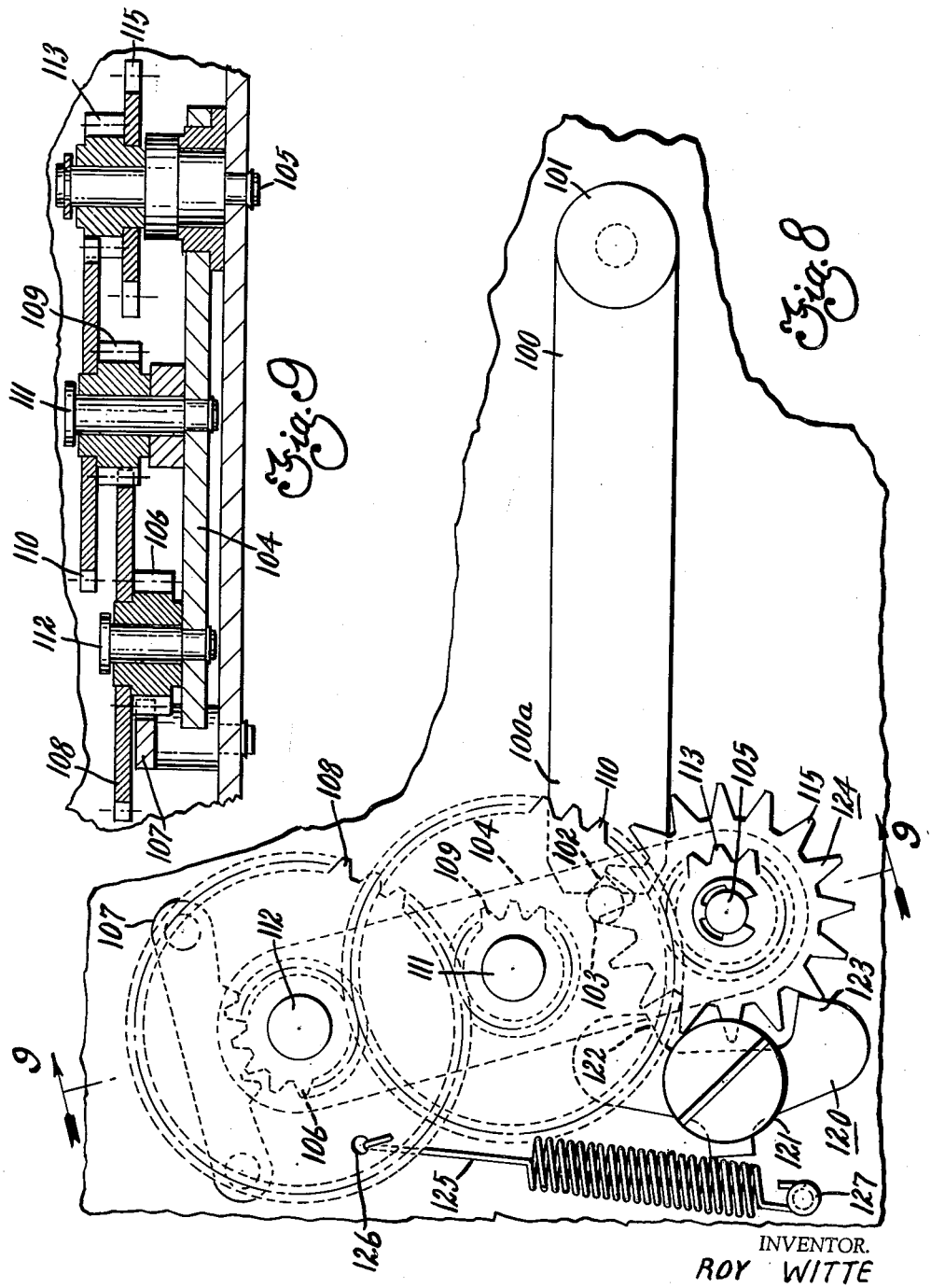

United States Patent Office 2,976,735
Patented Mar. 28, 1961

2,976,735

MECHANICAL TIME DELAY MECHANISM

Roy Witte, West Hartford, Conn., assignor to General Motors Corporation, Detroit, Mich., a corporation of Delaware Filed Sept. 12, 1958, Ser. No. 760,763

7 Claims. (Cl. 74—1.5)

This invention relates to time delay mechanisms, and particularly to a mechanical time delay mechanism to provide for delay action in the opening and closing of valves for regulating supply and exhaust of fluid to a pneumatic pressure receiving structure.

The time delay mechanism of this invention, as illustrated in the drawings, is adapted to delay the opening and closing of inlet and exhaust valves that supply air to an air spring or exhaust air from an air spring. Even more specifically, the time delay mechanism, or damping mechanism, is adapted to resist actuating forces transmitted from the axle of a vehicle to the valve actuating mechanism so that the valve actuating mechanism will not open and close the valves in response to every axle movement of the vehicle relative to the body of the vehicle.

In suspension systems for vehicles, and particularly motor vehicles, wherein a pneumatic or air spring is placed between the sprung mass and the unsprung mass of the vehicle, it is desirable to be able to change the air pressure within the air spring to compensate for a change of load carried by the vehicle. Thus, when load increases air pressure will be increased within the air spring and when load decreases air pressure within the air spring will be allowed to exhaust so that the sprung mass of the vehicle, that is the chassis and the body, will be maintained at a substantially constant clearance height relative to the unsprung mass of the vehicle, that is the running gear.

To regulate the inlet and exhaust of air pressure to and from the air spring, suitable valves are actuated in response to a change in the predetermined clearance height. Usually the body of the valve structure is carried on the sprung mass or chassis of the vehicle and the valves in the valve body are connected with the axle of the vehicle by suitable linkage so that a change in the predetermined clearance height will reflect itself on the control valves to open and close the same, as necessary.

However, it is not desirable that every axle movement of the vehicle relative to the chassis effect an opening or closing of the inlet and exhaust valves with the resultant constant supply and exhaust of air to the air spring. It is desirable that the effect of the movements of the axle, caused by road roughness and normal operation of the vehicle over the road, on the air inlet and exhaust valves be damped to delay the action of the inlet and exhaust valves. Normally the axle movements of the vehicle are substantially the same in either an up or down direction, the movements averaging out to a zero condition so that if the opening and closing of the inlet and exhaust valves of the air control valve are delayed in their respective movements by a damping device, these valves will not normally be actuated to supply air to the air spring or exhaust air from the air spring during normal road operation of the vehicle.

However, if the air spring system should lose air or if the load should be increased or decreased in the vehicle, such a change will be reflected in a permanent change in the clearance height between the sprung mass and the unsprung mass of the vehicle with the result that such a change will be for a sufficiently prolonged time period as to overcome the effect of the damping device or time delay mechanism with the result that the inlet or exhaust valve of the air control valve will be opened or closed to correct for the change in clearance height.

It is an object of this invention to provide a mechanical time delay mechanism that will damp movement of an actuating member, which actuating member can be used for operating the inlet and exhaust valves of a control valve in an air suspension system.

It is another object of the invention to provide a mechanical time delay or damping mechanism that utilizes an escapement mechanism to provide the timing or damping control of the time delay or damping mechanism, an anchor escapement being particularly adapted for this purpose.

It is another object of the invention to provide an actuating member for operating a mechanism to be controlled with an oscillating motion, the oscillating motion of the actuating member being connected with a motion translating mechanism which translates the oscillating motion into a rotary motion for driving gear train means that, in turn, drive an escapement mechanism which controls the timing effect or damping effect of the delay mechanism.

It is another object of this invention to provide a time delay or damping mechanism in accordance with any of the foregoing objects wherein the actuating member that operates other mechanism has a normally attained central position from which is oscillates in either direction, the actuating member being returned to its center position through the action of a motion translating mechanism that translates the oscillating motion of the actuating member into a rotary motion for driving a gear train; the actuating member also being returnable to its center position at a rate of movement that is greater than its rate of movement away from its center position.

Further objects and advantages of the present invention will be apparent from the following description, reference being had to the accompanying drawings wherein preferred embodiments of the present invention are clearly shown.

In the drawings:

Fig. 2 is a cross-sectional view of the control valve incorporating the time delay or damping mechanism, but with the time delay mechanism shown in elevation.

Fig. 3 is a cross-sectional view taken along line 3—3 of Fig. 1.

Fig. 4 is a cross-sectional view taken along line 4—4 of Fig. 1.

Fig. 5 is a cross-sectional view taken along line 5—5 of Fig. 2.

Fig. 6 is a cross-sectional view taken along line 6—6 of Fig. 2.

Fig. 7 is a cross-sectional view taken along line 7—7 of Fig. 1.

Fig. 8 is a plan view of a modified arrangement of time delay or damping mechanism incorporating features of this invention.

Fig. 9 is a cross-sectional view taken along line 9—9 of Fig. 8.

Figure 1:
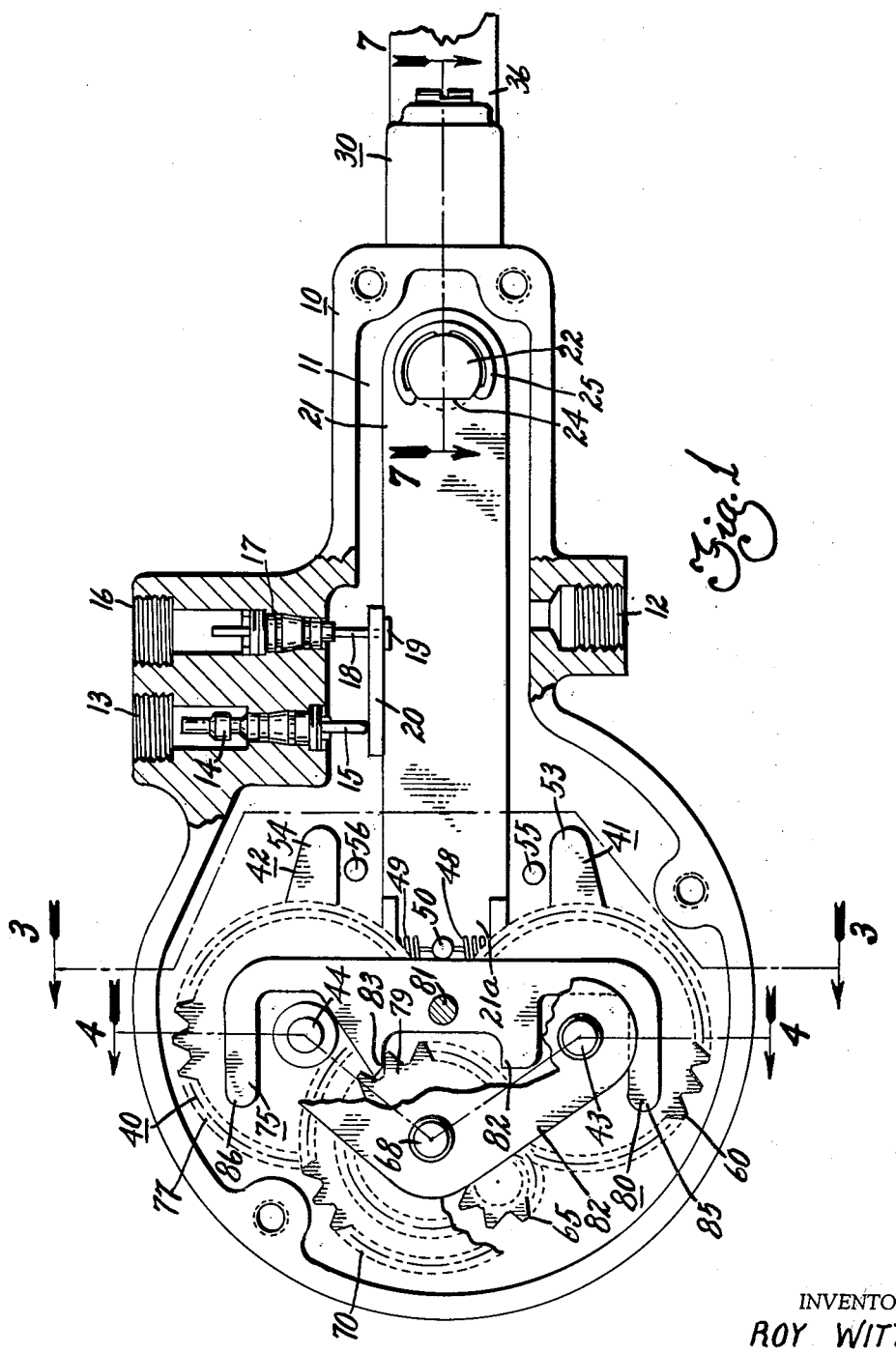
Fig. 1 is a cross-sectional view of an air control valve incorporating the mechanical time delay or damping mechanism of this invention.

The mechanical time delay or damping mechanism of this invention is illustrated as being incorporated in an air control valve for controlling supply of air to an air spring and exhaust of air from an air spring.

The valve that controls the flow of air to and from an air spring consists of a body 10 having a central cavity or chamber 11. A port 12 is adapted for connection with an air spring of a motor vehicle, the port 12 being connected by suitable conduit means with the air spring to supply air to the air spring from the chamber 11 or exhaust air back into the chamber 11 from the air spring. The air spring may be any suitable flexible bellows or diaphragm arrangement disposed between the axle and chassis of a motor vehicle, the pressure of the air in the air spring supporting the chassis relative to the axle and providing resilience in the support, in a manner well known in the art.

The valve 10 has an air pressure inlet port 13 that is connected with a suitable source of air under pressure, such as a supply tank maintained at a predetermined pressure by means of an air compressor drivingly connected with the engine of the motor vehicle. The inlet port 13 contains an air control valve 14 that is of a conventional tire valve type which opens to allow air to flow into the chamber 11 when the valve stem 15 is moved in an upward direction, as viewed in Fig. 1. The valve 10 is also provided with an air exhaust port 16 that receives a control valve 17 of the conventional tire valve type which opens to allow air to exhaust from the chamber 11 through the port 16 when the valve stem 18 is moved downwardly, as viewed in Fig. 1.

The valve stem 18 has an enlarged head 19 that is disposed beneath a member 20 carried on an actuating arm 21 that is secured to the oscillatable shaft 22 journaled in the valve body 10 in the bearing bore 23, as shown in Fig. 7. The shaft 22 has a flat side 24 engaged by a similar flat side on the actuating arm 21 which causes the arm 21 to oscillate with the shaft 22. The arm 21 is carried between the C washer 25 and the shoulder 26 on the shaft 22.

The member 20 that is secured on the actuating arm 21 engages the enlarged head 19 of the exhaust valve 17 on downward movement of the arm 21 and engages the stem 15 of the valve 14 on upward movement of the arm 21, as viewed in Fig. 1. Such oscillating movements of the arm 21 will open and close the inlet and exhaust valves 14 and 17 for supply of air to the air spring and exhaust of air therefrom.

The shaft 22 projects exteriorly of the valve body 10 and has an overtravel mechanism 30 secured on the projecting end of the shaft 22. The overtravel mechanism consists of a body 31 having an internal cylinder bore 32 which receives the piston 33 engaging a recessed flat portion 34 on the shaft 22. A compression spring 35 retains the piston 33 in engagement with the flat portion 34. An operating arm 36 is secured to the body 31 by any suitable means, such as screws 37. The operating arm 36 is adapted for connection with the axle of a vehicle so that when the control valve 10 is suitably mounted on the chassis of the vehicle, the arm 36 will be oscillated by the up and down movement of the axle of the vehicle, this up and down movement being transmitted through the shaft 22 to the actuating arm 21 for operation of the air valves 14 and 17.

The overtravel mechanism 30 allows the arm 36 to oscillate at a frequency much higher and different from the frequency of oscillation of the arm 21, the arm 21 being retarded in its movement by the time delay or damping mechanism 40 hereinafter described. Since movement of the arm 21 is resisted by the time delay mechanism, the arm 36 is allowed movement relative to the arm 21 by the piston 33 reciprocating in the cylinder 32. However, if the frequency of movement of the arm 36 in an up and down direction will effect a can the arm 21 as permitted by the time delay or damping mechanism 40, there will be in effect a direct drive connection between the arm 36 and the arm 21 through means of the overtravel mechanism 30.

Also, when the sprung mass or chassis of the vehicle is at the predetermined clearance height relative to the unsprung mass, or wheel system, of the vehicle, since the average time interval for movement of the arm 36 in its frequency of movement as caused by the wheel system of the vehicle is substantially the same on both sides of a normally assumed center position, the movements of the arm 36 in an up and down direction will effect a canceling of the movements with a resultant effect of no movement of the arm 21. Should the load of the vehicle be increased, or should air be lost from the air springs, causing the sprung mass of the vehicle to fall below the normally maintained predetermined clearance height, the average movement of the arm 36 in its frequency of motion will be to one side of the normally maintained center position with the result that if the average movements of the arm 36 are maintained to one side of the center position for a time duration greater than the delay time of the time delay mechanism or damping mechanism 40, the arm 21 will be moved to open the valve 14 and allow air under pressure to be admitted to the air spring to correct for loss of air pressure or the increased load. Similar action occurs upon reduction of load in the vehicle, but in the reverse direction.

While the mechanical time delay or damping mechanism is illustrated and described in cooperation with an air control valve for use in an air suspension system, it will be appreciated that the delay or damping mechanism is not limited to such use.

As illustrated in Figs. 1 to 7 inclusive, the time delay or damping mechanism 40 consists of a pair of oscillatable members 41 and 42 that are pivotally carried on the stub shafts 43 and 44 respectively that are mounted on the wall 45 of the valve body 10. These members 41 and 42 each have a protruding portion 46 and 47 respectively that engage opposite sides of the lever 21 at the oscillatable end 21a of the lever, thereby holding the end 21a between the oscillatable members 41 and 42, tension springs 48 and 49 extending between a pin 50 on the lever 21 and pins 51 and 52 carried on the members 41 and 42 respectively, the springs providing the force required to hold the elements 41 and 42 against opposite sides of the end portion 21a of the lever 21. The members 41 and 42 also have extensions 53 and 54 respectively that engage stop pins 55 and 56 respectively to limit counterclockwise rotation of the member 41 about the pivot shaft 43 and clockwise rotation of the member 42 about its pivot shaft 44 as viewed in Fig. 1. The members 41 and 42 are secured to hubs 57 and 58 respectively that, in turn, are journaled on the hubs 64 and 59 respectively, as shown in Fig. 4. The hub 64 has a gear 60 secured on the upper end thereof and the hub 59 has a gear 61 similarly secured on the upper end thereof. A friction clutch spring 62 is positioned around the hub portions 57 and 64 to drive hub portion 64 when the element 41 oscillates in a clockwise direction, as viewed in Fig. 1. Similarly, a friction clutch spring 63 surrounds the hub portions 58 and 59 to drive the gear 61 when the member 42 rotates in a counterclockwise direction, as viewed in Fig. 1. The direction of the spiral of clutch spring 62 is counterclockwise, whereas the direction of spiral of clutch spring 63 is clockwise. Thus, when the member 41 rotates in a clockwise direction, the clutch spring 62 is tightened on the hub portions 57 and 64 to drive hub portion 64 with hub portion 57; but upon counterclockwise rotation of member 41, the clutch spring 62 is loosened to allow the member 41 to rotate in a counterclockwise direction freely relative to the hub portion 57. Similar action occurs with respect to member 42, but in the reverse direction.

Gear 60 meshes with an idler gear 65 carried on the stub shaft 66. The idler gear 65 meshes with a pinion 67 supported for free rotation on the stub shaft 68. The gear 61 meshes with the gear 67 so that with the gear 60 being drivingly connected with gear 67 through the idler gear 65, the pinion 67 is rotated unidirectionally even though gears 60 and 61 rotate oppositely. A gear 70 is also carried on the stub shaft 68 and is fixedly secured with respect to the pinion 67. Thus gear 70 becomes a unidirectionally rotated drive gear that drives an escapement mechanism 75 hereinafter described.

The drive gear 70 meshes with a pinion 76 that is an integral part of the gear 77, the pinion and gear being supported on the stub shaft 44 for free rotation thereon. The gear 77 meshes with a pinion 78 that is an integral part of the starwheel or escapement wheel 79 of the escapement mechanism 75, the pinion 78 and integral starwheel 79 being supported for free rotation on the stub shaft 68. Thus the pinion 76, the gear 77 and the pinion 78 provide for a speed increase of the starwheel 79 relative to the drive gear 70.

The starwheel, or escape wheel 79, is controlled by the anchor pawl member 80 that is pivotally mounted on the pivot pin 81 carried in the plate 82 that supports and interconnects the upper ends of the stub shafts 43, 68 and 44, as shown in Fig. 4. The pawl member 80 includes a pawl 82 and a second pawl 83 adapted alternately to engage the starwheel or escape wheel 79, as the wheel is caused to rotate under the driving action of the gear train heretofore described. The pawl member also includes balance weight portions or timing weight portions 85 and 86 on opposite ends of the member 80, the mass weight of the pawl member 80 regulating the speed of rotation of the escape wheel 79 and thereby, in turn, back through the gear train, controlling the rate of movement of the end portion 21a of the arm 21 from a center position in either direction of its movements from center position.

With a predetermined force of movement applied to the arm 21 tending to move it from its center position in either direction, the mechanical time delay device 40 will maintain the rate of movement of the end portion 21a of the arm 21 at a predetermined speed of movement. It will, of course, be appreciated that if the force applied to the arm 21 tending to move it in either direction from its center is either greatly amplified or reduced from the predetermined force of application, the time delay rate of the mechanical time delay mechanism 40 will be modified in proportion to the increase or the decrease of the force applied. But since the force applied to the arm 21 for movement thereof in either direction from its center position is transmitted through the overtravel mechanism 30, and more specifically by retention of the piston 33 in engagement with the flat portion 34 on the shaft 22 by the spring 35, the value of the force applied to the shaft 22 to oscillate it in either direction is limited by the force effect of the spring 35. Therefore, if the force applied to the operating arm 36 increases greatly over the applied force desirable on the arm 21 to move it at a predetermined rate of movement, the force applied through the arm 36 will largely be absorbed by compression of the spring 35 with the piston 33 moving against the spring 35 as it tends to ride on one or the other of the edges of the flat portion 34 of the shaft 22 in attempting to rotate the shaft 22 that is being delayed in its rotation by the time delay or damping mechanism 40.

It will, therefore, be seen that the overtravel mechanism 30 not only provides for a difference in frequency of movement of the arm 36 relative to the arm 21, but it also provides a mechanism by which the maximum degree of force applied to the shaft 22 is regulated by the spring 35 so that a wide variation of force applied to the operating arm 36 will have substantially no effect on the rate of movement of the arm 21 as damped or time delayed by the mechanism 40 in opening and closing the inlet and exhaust valves 14 and 17 respectively.

It will be noted from Fig. 6 that the end portion 21a of the arm 21 is disposed in a free condition between the protrusions 46 and 47 on the members 41 and 42. Thus, for example, if the arm 21 moves downwardly, as viewed in Figs. 1 and 6, the member 41 will rotate in a clockwise direction to drive the gear train and escape mechanism in a manner heretofore described until the arm 21 engages the stop pin 55. But before the arm 21 engages the stop pin 55 the end portion 54 of member 42 will engage the stop pin 56 so that during a substantial portion of the movement of the arm 21 in the downward direction mentioned, the upper side of the arm will be disengaged from the protrusion 47 on the member 42. This action will open the exhaust valve 17.

However, when the arm 21 moves in a direction reverse to that just described, during exhaust of air from the air spring in returning the sprung mass of the vehicle into the predetermined height relation to the unsprung mass, the end portion 21a of the arm 21 is free to move quickly in this reverse direction of movement under action of the springs 48 and 49 that are now in a condition of imbalance tending to return the arm 21 to its neutral or center position. Thus the arm will be returned to its neutral or center position rapidly until it engages the protrusion 47 on the member 42. Similar action occurs on reverse, or up movement of the arm 21.

In Figs. 8 and 9 there is illustrated a modified arrangement of a time delay or damping mechanism to damp movement of an actuating arm.

In the arrangement of Figs. 8 and 9 an actuating arm 100 is pivotally mounted on the pivot connection 101 whereby the end portion 100a oscillates from a neutral or center position. The end portion 100a has a V-shaped notch 102 engaging a pin 103 carried in an arm 104 that is pivotally carried on the stub shaft 105 for oscillation about the stub shaft with a pinion 106 on the opposite end of the arm 104 traveling over a gear rack 107 fixedly secured to the base of the mechanism.

The pinion 106 is integral with the gear 108 whereby oscillation of the pinion over the rack 107 effects rotation of the gear 108.

The gear 108 meshes with a pinion 109 that is integral with a gear 110 carried on the stub shaft 111 that, in turn, is secured to the arm 104 whereby the gear 110 oscillates with the arm 104 so that the axes of the stub shafts 105, 111 and the stub shaft 112 that carries the gear and pinion 108—106 are in linear alignment.

The gear 110 meshes with a pinion 113 that is integral with the starwheel or escape wheel 115 of an escape mechanism 124. It will thus be seen that oscillation of the arm 100 about the pivot connection 101 will rotate the gear train through the motion translating mechanism comprising the arm 104, the pinion 106 and the rack 107.

The starwheel or escape wheel 115 is under regulating control of the anchor pawl 120 that is pivotally carried on the pivot connection 121, the pawls 122 and 123 alternately engaging the escape wheel 115 as the escape wheel rotates. The mass weight of the anchor pawl 120 together with the movement of teeth on the escape wheel 115 regulates the speed of rotation of the escape wheel and thereby the speed of rotation of the gears of the gear train which control the rate of oscillation of the arm 100.

A tension spring 125 is fastened to the gear 108 by having the end thereof pass through a hole 126 in the gear, the opposite end of the spring being attached to a fixed pin 127.

Oscillation of the arm 100 in either direction from its normal center position will oscillate the arm 104 with the oscillation being translated to rotary motion in the gear train, gear 108 rotating clockwise, as viewed in Fig. 8, whenever the arm 100 moves from its center position with either side of the V-shaped cam surface 102 driving the pin 103 in a left-hand direction counterclockwise about the stub shaft 105.

The spring 125 will tend to always rotate the gear 108 in a counterclockwise direction for return of the pin 103 into a position engaging both sides of the V-shaped cam 102 and thereby position said arm 100 in its central or neutral position.

The arm 100 is adapted to operate a suitable mechanism, such as the inlet and exhaust valves 14 and 17 of the air control valve illustrated in Fig. 1, the time delay or damping mechanism shown in Figs. 8 and 9 being substituted for the damping or time delay mechanism 40 illustrated in Fig. 1.

While the embodiments of the present invention as herein disclosed constitute preferred forms, it is to be understood that other forms might be adopted.

What is claimed is as follows:

1. A mechanical time delay mechanism, comprising, actuating arm means having a center static position and supported on pivot means for operation of one end thereof in either direction from said center position on application of a force thereto in either of opposite directions, gear train means operably connected with said arm means for rotation thereby in one common rotary movement on operation of said arm means in either direction of oscillation of said end from the said center static position, the said operable connection of said gear train means with said arm means comprising motion translating means between said arm means and said gear train means to drive said gear train means and translate oscillation of the said arm means to said one common rotary movement in the gear train means on movement of the said arm means in either direction of movement from said center static position, spring means operably connected with said motion translating means continuously urging the same to return said actuating arm means to said center static position, and escapement mechanism including an escapement wheel connected to and driven by said gear train means with the said escapement wheel being driven in one common direction of rotation from the said gear train means on movement of the said arm means in either direction of movement thereof to control the speed of rotation of the said gear train means by the said escapement mechanism and thereby control rate of oscillation of said arm means in either direction of movement of the said arm means to damp movement thereof at the same rate of movement in either direction of movement of the said arm means relative to said center static position.

2. A mechanical time delay mechanism, comprising, actuating arm means having a center static position and supported on pivot means for oscillation of one end thereof in either direction from said center position on application of a force thereto in either of opposite directions, oscillatable means movable substantially normal to said arm means and having connection with said one end of said arm means to place the said arm means in said center static position and including spring means operably connected with said oscillatable means to return thereby said arm means to said center static position after movement in either direction from the center position, gear train means operably connected to said oscillatable means and rotated by said oscillatable means on oscillation of said oscillatable means by said arm means in either direction of oscillation of the said end of the arm means from the said center static position, said oscillatable means having driven connection with said end of said arm means wherein said arm means oscillatably drives said oscillatable means and having driving connection with said gear means translating the oscillatory motion of the said oscillatable means to one common rotary motion in the gear train means on oscillation of said arm means in either direction of movement, and escapement mechanism gear connected with said gear train means and actuated thereby to regulate by the said escapement mechanism the speed of rotation of said gear train means and thereby the rate of oscillation of said arm means to damp movement of said arm means in either direction of movement thereof.

3. A mechanical time delay mechanism arranged in accordance with the structure of claim 2 wherein the connection of the oscillatable means with the said arm is separated from the driving connection of the said oscillatable means with the gear train means that the oscillatable means actuates the arm means to return the same to center position independent of the drive connection between the oscillatable means and the gear train.

4. A mechanical time delay mechanism, comprising, actuating arm means having a center static position and supported on pivot means for oscillation of one end thereof in either direction from said center position on application of a force thereto in either of opposite directions, a second oscillatable arm pivotally mounted adjacent said one end of said actuating arm and having driven connection with said one end of said actuating arm to oscillate said second arm thereby on oscillation of said actuating arm in either direction of movement, said second arm being oscillated substantially normal relative to said actuating arm and in substantially the same plane, said second arm carrying gear means on the oscillatable end thereof engaging a gear rack to rotate thereby said gear means on oscillation of said second arm, said driving connection between said actuating arm and said second arm normally retaining said actuating arm in said center static position, spring means operably connected with said second arm urging the same in a direction of movement to retain said actuating arm in its said center position and return the same to said center position after movement in either direction from said center position, and an escapement mechanism gear connected with said gear means and actuated thereby to control the speed of rotation of the said gear means and thereby the rate of oscillation of said actuating arm means to damp movement thereof at the same rate in either direction of movement of the actuating arm means from its center static position.

5. A mechanical time delay mechanism, comprising, actuating arm means mounted for oscillation of one end thereof, first and second oscillatable members disposed at opposite sides of said actuating arm at the oscillatable end thereof, spring means between said actuating arm and said oscillating members positioning said actuating arm normally in a central position between said oscillating members, first and second gear means for rotation by said first and second oscillatable members respectively, clutch means between said first and second oscillatable members and said first and second gear means respectively to effect rotation of the respective gear means on movement of said oscillatable members outwardly relative to the said center position of said actuating arm, and escapement mechanism geared with said first and second gear means and actuated thereby to regulate the speed of rotation of said gear means and thereby the rate of oscillation of said actuating arm to damp movement of said actuating arm.

6. A mechanical time delay mechanism arranged in accordance with the structure of claim 5 wherein the escapement mechanism comprises an anchor escapement.

7. A mechanical time delay mechanism arranged in accordance with the structure of claim 5 that includes idler gear means in a gear train between said escapement mechanism and said first and second gears whereby to effect unidirectional rotation of said escapement mechanism.

References Cited in the file of this patent

UNITED STATES PATENTS

| | | |
|---|---|---|
| 2,081,727 | Barenyi | May 25, 1937 |
| 2,844,384 | Jackson | July 22, 1958 |